United States Patent
Föll

(10) Patent No.: US 7,623,636 B2
(45) Date of Patent: Nov. 24, 2009

(54) SYSTEM FOR GENERATING SERVICE-ORIENTED CALL-CHARGE DATA IN A COMMUNICATION NETWORK

(75) Inventor: Uwe Föll, Falkensee (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 0 days.

(21) Appl. No.: 10/566,718

(22) PCT Filed: May 19, 2005

(86) PCT No.: PCT/DE2005/000962

§ 371 (c)(1),
(2), (4) Date: Jan. 17, 2007

(87) PCT Pub. No.: WO2005/117341

PCT Pub. Date: Dec. 8, 2005

(65) Prior Publication Data

US 2007/0127646 A1     Jun. 7, 2007

(30) Foreign Application Priority Data

May 26, 2004 (DE) ........................ 10 2004 026 140

(51) Int. Cl.
H04M 15/00 (2006.01)
H04M 11/00 (2006.01)

(52) U.S. Cl. ............................. 379/114.03; 379/114.01; 379/114.28; 455/405

(58) Field of Classification Search ............ 379/114.01, 379/114.03, 114.15, 114.2, 114.28, 219, 379/221.06; 455/405–408; 370/352; 705/26
See application file for complete search history.

(56) References Cited

U.S. PATENT DOCUMENTS

| 5,873,030 | A | 2/1999 | Mechling et al. |
| 6,338,046 | B1 | 1/2002 | Saari et al. |
| 6,463,275 | B1 | 10/2002 | Deakin |
| 2003/0152039 | A1* | 8/2003 | Roberts .................... 370/255 |
| 2003/0232616 | A1* | 12/2003 | Gidron et al. ............. 455/406 |
| 2004/0255025 | A1* | 12/2004 | Ricagni .................... 709/224 |

FOREIGN PATENT DOCUMENTS

| CN | 1356812 A | 7/2002 |
| KR | 2003-0027483 | 4/2003 |
| WO | WO 01/72074 | 9/2001 |
| WO | WO 2004/036825 | 4/2004 |
| WO | WO 2004/036890 | 4/2004 |

OTHER PUBLICATIONS

Carle, G. et al., AP 6.2 Service oriented and Convergent Charging—Analysis Paper, 3GET: 3G Evolving Technologies, Jun. 2004.

(Continued)

Primary Examiner—Quoc D Tran
(74) Attorney, Agent, or Firm—Staas & Halsey LLP

(57) ABSTRACT

A system generates service-oriented call-charge data for at least one service in a communication network, the system having in at least one first area (charge metering domain), network elements for charge metering—metering points—and in at least one second area (charging domain), network elements for charging—charging points. The system has a policy function which controls both the metering points and the charging points by using predefined rules.

15 Claims, 1 Drawing Sheet

OTHER PUBLICATIONS

Chen, C-Y. et al., Billing Service Based on TINA Concepts for the Next Generation Network, IEEE Intelligent Network Workshop, Jun. 5, 2001, pp. 320-324.

Artiges, D. et al., TMN Based Accounting Management Architechture, IEEE, Dec. 11, 1996, pp. 11/1-11/6.

Zseby, T. et al., Policy-based Accounting, IETF Standard-Working-Draft, Internet Engineering Task Force, Aug. 2002, pp. 11-37.

Van Le, M. et al., A Service Component-based Accounting and Charging Architecture to Support Interim Mechanisms across Multiple Domains, IEEE Network Operations and Management Symposium, Apr. 2004, pp. 555-568.

* cited by examiner

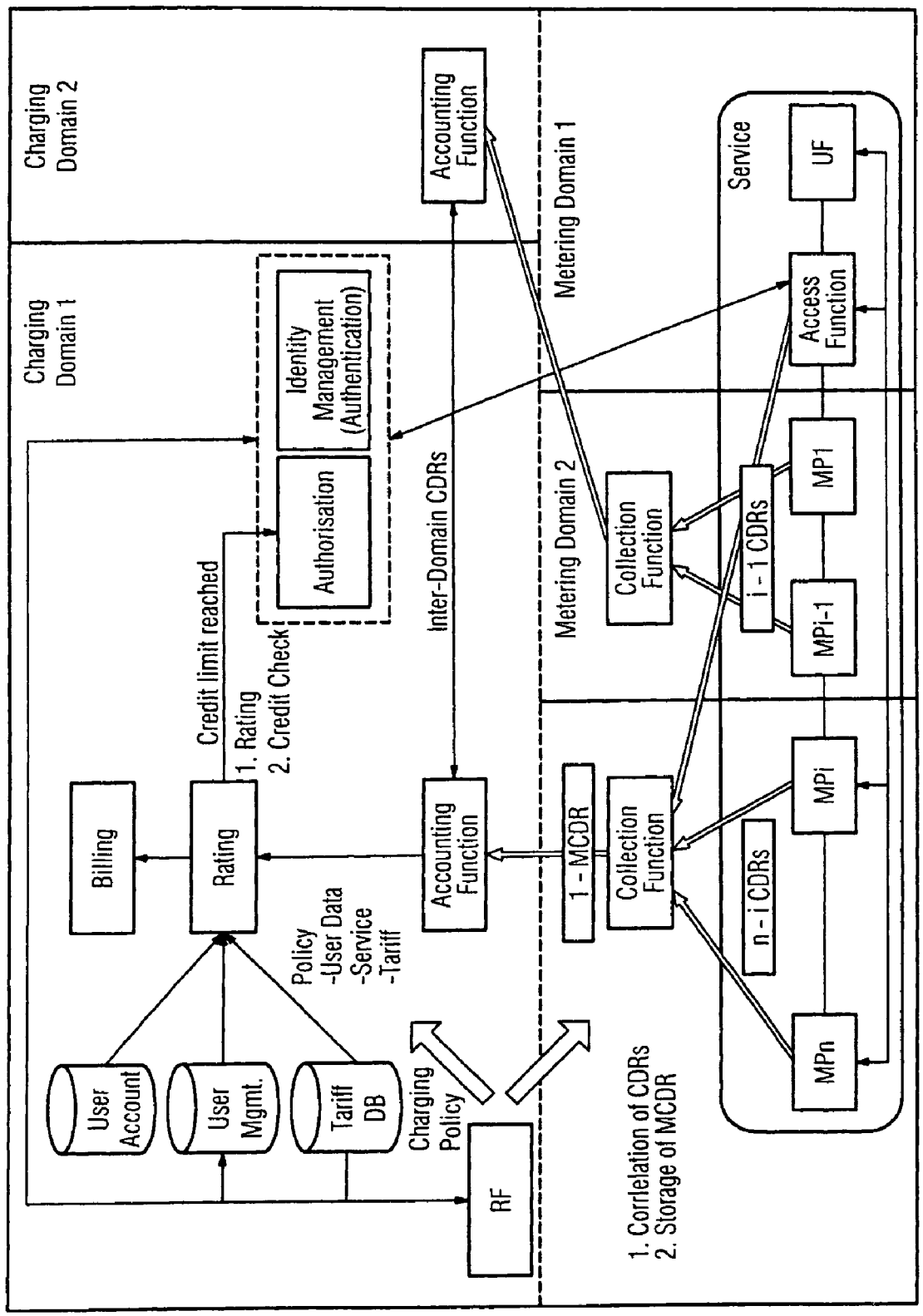

SYSTEM FOR GENERATING SERVICE-ORIENTED CALL-CHARGE DATA IN A COMMUNICATION NETWORK

CROSS REFERENCE TO RELATED APPLICATIONS

This application is based on PCT Application No. PCT/DE2005/000962, filed 19 May 2005, and hereby claims priority to German Application No. 10 2004 026 140.7 filed on 26 May 2004, the contents of which are hereby incorporated by reference.

BACKGROUND OF THE INVENTION

The present invention relates to a system for generating service-oriented call-charge data for at least one service in a communication network. The system comprises in at least one first domain, a so-called charge metering domain, network elements for charge metering, called charge metering points in the text that follows, and in at least a second domain, a so-called charging domain, network elements for charging, called charging points in the text which follows.

Charge metering for services in communication networks has hitherto been based on a largely independent and unsynchronized metering of a resource utilization, required for the service, by the network elements involved in the performance or production of the service. Following the utilization, resultant or collected or metered call-charge data are collected in network elements provided for this purpose for generating a service-oriented bill. In a so-called pre-paid method, the charge metering described must take place during the resource utilization.

To be able to perform the charge metering described, all network elements involved in the charge metering must have an unambiguous correlation identifier. This correlation identifier unambiguously identifies all call-charge records which belong to a performance of an actual service and must, therefore, be entered in the call-charge records so that these can be centrally correlated with one another.

One of the central problems of the correlation-based charge metering described is the distribution of the correlation identifier to all network elements involved which has to be performed. The network elements can operate on different network layers such as, for example, on a so-called layer 2, 3 or 7 and at the same time also in various network domains such as, for example, in a so-called PS domain (packet switched) or in a so-called IMS (IP multimedia subsystem). It is also conceivable that the network elements involved in the performance of a service are also separate from one another due to technology boundaries. Thus, the network elements can be based, for example on UMTS (universal mobile telecommunications system) or WLAN (wireless local area network). In such a heterogeneous environment, a mechanism for distributing the correlation identifier must be defined and subsequently standardized for each new service. Due to this procedure, a rapid and flexible introduction of new services is not guaranteed. Due to the problem presented, it was not possible, for a long time, to offer the so-called MMS (multi media service) for pre-paid subscribers due to a lack of charging methods. The complexity already existing in the charge metering is increased with the new distributed network architectures, in such a manner that charge metering by the present methods described will no longer be controllable in future.

The inefficiency of the existing methods represents a further problem. Hitherto, call-charge data are collected in all network elements involved and the resultant charge records forwarded to a central place. This central place must find the call charge records belonging together out of a flood of data. Following this, the important call-charge records are evaluated and the remaining records are discarded.

SUMMARY OF THE INVENTION

It is one possible object of the present invention to provide a system with the aid of which it becomes possible to generate service-oriented call-charge data for a service in a communication network as simply, efficiently and rapidly as possible.

A system for generating service-oriented call-charge data is provided for at least one service in a communication network, the arrangement having in at least one first domain, a so-called charge metering domain, network elements for charge metering, called charge metering points in the text which follows, and in at least one second domain, a so-called charging domain, network elements for charging, called charging points in the text which follows. The system is characterized by the fact that the system comprises a policy function which controls both the charge metering points and the charging points by using predefined rules. For this purpose, the policy function distributes rules to individual charging processes, that is to say to individual metering and charging processes. A charging is understood to be a function implemented in a charge metering point or a charging point. Controlling includes the switching-on and-off of call-charge processes, and instructions as to which data are to be metered and how the metered data are to be processed.

In a particularly preferred embodiment of the system, the policy function controls all charge metering points comprised in the system. In contrast, the policy function defined in 3 GPP, the so-called policy decision function (PDF) only controls one access network node, namely a GGSN (gateway GPRS support node) in the GPRS communication network for the local control of resource allocations. Furthermore, controlling charging points is generally not provided in 3 GPP. Charging points are, for example, collection functions and correlation functions, so-called tariffing functions, credit or debit monitoring functions and account management functions. In addition, these can also be service and/or access authorization functions.

The policy function of the system is preferably designed in such a manner that the policy function controls all charging processes of the at least one service. Charging processes of different services are in each case preferably controlled separately for each service of the policy function. In this preferred embodiment of the system, the policy function, has access to subscriber data, service data and tariff data.

In a further preferred embodiment of the system, the policy function is designed in such a manner that it can control a charge metering relating to the service, taking place simultaneously during the performance of the at least one service.

In addition, the policy function can preferably also control a simultaneous monitoring of predefined call-charge thresholds relating to the service.

In another preferred embodiment of the system, the policy function has an interface to a service computer producing the at least one service. Via this interface, an interactive control can be effected.

Furthermore, it is conceivable that the policy function has one interface each to the network elements to be controlled, via which the rules applied for controlling are in each case distributed. This means that each network element to be controlled is directly contacted by the policy function or controlled by using corresponding rules.

In another preferred embodiment of the system, the policy function has an interface for forwarding the rules used for controlling to one of the network elements to be controlled from where they are forwarded to the remaining network elements to be controlled. This means that the rules are progressively forwarded from network element to network element.

The system provides for a centralized and, at the same time, dynamic control of call-charge processes during the utilization of a service in a communication network. The policy function provided in the system has rules by which control is to be effected and can conduct these to corresponding charge metering and charging points. Due to the centralized position of the policy function, simple and efficient control is possible.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows a diagrammatic representation of a system according to one embodiment of the invention.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

FIG. 1 shows a system which comprises various domains of a communication network. Two charging domains 1 and 2 and two charge metering domains 1 and 2 of a communication network are shown. A service is to be produced, in the performance of which for a user UF (user function), a plurality of domains of the communication network are involved. This means, for example, that data for producing the service are transmitted via a plurality of network elements in which so-called metering points (MP) are in each case implemented. Furthermore, a policy function RF is provided which can intervene in a controlling manner on both types of domains which is supposed to be made clear from the arrows printed in bold and the expression "charging rules". The individual metering points (MPs—i.e.: MPn . . . MP 1) of the service can be controlled by the policy function RF in such a manner that they either meter data or do not. Metering and storage of data takes place on call-charge data records, so-called CDRs— charging data records. Furthermore, they are notified by the policy function about the places, to which the results, that is to say the CDRs, are to be transmitted. The CDRs are, as a result collected in a specific collection function arranged in the respective charge metering domain and stored on a so-called master charging data record (MCDR), that is to say in a type of combination of a plurality of CDRs and forwarded by the collection function to an accounting function which is located in a charging domain allocated to the respective charge metering domain. If then a plurality of accounting functions are involved due to a scenario extending over a plurality of domains, these accounting functions must perform inter-domain signaling for exchanging and processing the collected data or CDRs.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A system for generating service-oriented call-charge data for at least one service in a communication network, comprising:
   a charge metering domain;
   metering points, the metering points being network elements for charge metering provided in the charge metering domain;
   data for producing the service for a user being transmitted via a number of network elements in which in each case the metering points are implemented; the metering points for charge metering the data;
   a charging domain;
   charging points, the charging points being network elements for charging provided in the charging domain; and
   a policy function which controls both the metering points and the charging points by using predefined rules.

2. The system as claimed in claim 1, wherein
   the policy function controls all charge metering points in the system.

3. The system as claimed in claim 1, wherein
   the policy function controls all charging processes for at least two different services, the charging processes being controlled separately for each of the different services.

4. The system as claimed in claim 1, wherein
   the policy function controls charge metering relating to the at least one service simultaneously with performance of the at least one service.

5. The system as claimed in claim 4, wherein
   the policy function monitors predefined call-charge thresholds relating to the at least one service, the call-charge thresholds being monitored simultaneously with performance of the at least one service.

6. The system as claimed in claim 1 wherein
   the policy function has an interface to a service computer producing the at least one service.

7. The system as claimed in claim 1, wherein
   the policy function has an interface for each of the network elements to be controlled, via which the rules used for controlling are in each case distributed.

8. The system as claimed in claim 1, wherein
   the policy function has an interface for forwarding the rules used for controlling to a first of the network elements to be controlled, and
   the rules used for controlling are forwarded from the first of the network elements to a remainder of the network elements.

9. The system as claimed in claim 2, wherein
   the policy function controls all charging processes for at least two different services, the charging processes being controlled separately for each of the different services.

10. The system as claimed in claim 9, wherein
    the policy function controls charge metering relating to the at least one service simultaneously with performance of the at least one service.

11. The system as claimed in claim 10, wherein
    the policy function monitors predefined call-charge thresholds relating to the at least one service, the call-charge thresholds being monitored simultaneously with performance of the at least one service.

12. The system as claimed in claim 11 wherein
the policy function has an interface to a service computer producing the at least one service.

13. The system as claimed in claim 2, wherein
the policy function has an interface for each of the network elements to be controlled, via which the rules used for controlling are in each case distributed.

14. The system as claimed in claim 2, wherein
the policy function has an interface for forwarding the rules used for controlling to a first of the network elements to be controlled, and
the rules used for controlling are forwarded from the first of the network elements to a remainder of the network elements.

15. A method for generating service-oriented call-charge data for at least one service in a communication network, comprising:

providing a charge metering domain;
providing metering points as network elements in the charge metering domain;
transmitting data for producing the at least one service for a user via a number of network elements in which in each case the metering points are implemented;
metering charges for the at least one service at the metering points;
providing a charging domain;
providing charging points as network elements in the charging domain;
charging for the at least one service at the charging points; and
controlling both the metering points and the charging points using predefined rules.

* * * * *